United States Patent
Kim et al.

(10) Patent No.: US 10,265,779 B2
(45) Date of Patent: Apr. 23, 2019

(54) CARBON FIBER REINFORCED PLASTIC STACK MACHINING METHOD USING A MONITORING SENSOR

(71) Applicant: KOREA INSTITUTE OF INDUSTRIAL TECHNOLOGY, Cheonan-si, Chungcheongnam-do (KR)

(72) Inventors: Tae Gon Kim, Cheonan-si (KR); Seok Woo Lee, Seongnam-si (KR); Kyung Hee Park, Yongin-si (KR); Hyo Young Kim, Anseong-si (KR)

(73) Assignee: Korea Institute of Industrial Technology, Cheonan-si, Chungcheongnam-do (KR)

( * ) Notice: Subject to any disclaimer, the term of this patent is extended or adjusted under 35 U.S.C. 154(b) by 0 days.

(21) Appl. No.: 15/124,664

(22) PCT Filed: May 30, 2016

(86) PCT No.: PCT/KR2016/005723
§ 371 (c)(1),
(2) Date: Sep. 8, 2016

(87) PCT Pub. No.: WO2016/195358
PCT Pub. Date: Dec. 8, 2016

(65) Prior Publication Data
US 2018/0065188 A1    Mar. 8, 2018

(30) Foreign Application Priority Data
May 29, 2015    (KR) .................. 10-2015-0076504

(51) Int. Cl.
*B23B 39/08*      (2006.01)
*B23B 35/00*      (2006.01)
(Continued)

(52) U.S. Cl.
CPC ............. *B23B 39/08* (2013.01); *B23B 35/00* (2013.01); *B23Q 17/09* (2013.01); *G05B 19/416* (2013.01);
(Continued)

(58) Field of Classification Search
CPC .................................. B23B 35/00; B23B 39/08
See application file for complete search history.

(56) References Cited

U.S. PATENT DOCUMENTS

| 7,467,449 B1* | 12/2008 | Lee ....................... B23B 39/06 29/26 A |
| 2012/0294689 A1* | 11/2012 | Yagista ............... B23B 51/0036 409/200 |

(Continued)

FOREIGN PATENT DOCUMENTS

| JP | 11-309649 A | 11/1999 |
| KR | 1007431520000 B1 | 7/2007 |

(Continued)

*Primary Examiner* — Kenneth M Lo
*Assistant Examiner* — Chad G Erdman
(74) *Attorney, Agent, or Firm* — Rabin & Berdo, P.C.

(57) ABSTRACT

Provided is a carbon fiber reinforced plastic machining method using a monitoring sensor which includes the step (S10) of electrically connecting a spindle and the monitoring sensor by a computer numerical control (CNC) device, the step (S20) of determining a start position in relation to machining of the spindle and a machining finish position, and the step (S30) of controlling the movement speed and rotation speed of the spindle in accordance with the determination result.

7 Claims, 3 Drawing Sheets

(51) Int. Cl.
  *B23Q 17/09*  (2006.01)
  *G05B 19/416*  (2006.01)
(52) U.S. Cl.
  CPC ... *B23B 2226/275* (2013.01); *B23B 2260/128* (2013.01); *G05B 2219/49077* (2013.01)

(56) References Cited

U.S. PATENT DOCUMENTS

2014/0371751 A1* 12/2014 Thomas ............. A61B 17/1626
  606/80
2016/0346890 A1* 12/2016 Dunkin .............. B23Q 17/0966

FOREIGN PATENT DOCUMENTS

| KR | 10-1127213 B1 | | 3/2012 | |
|----|----|----|----|----|
| KR | 1020140002602 | * | 8/2013 | ............. B23B 49/00 |
| KR | 10-2014-0002602 A | | 1/2014 | |
| KR | 1014522150000 B1 | | 10/2014 | |
| KR | 1014910490000 | | 2/2015 | |

* cited by examiner

CARBON FIBER REINFORCED PLASTIC STACK MACHINING METHOD USING A MONITORING SENSOR

CROSS-REFERENCE TO RELATED APPLICATION

This application is the U.S. National Phase of International Application No. PCT/KR2016/005723, filed May 30, 2016, which claims priority to and the benefit of Korean Patent Application No. 10-2015-0076504, filed on May 29, 2015. Any and all applications for which a foreign or domestic priority claim is identified here or in the Application Data Sheet as filed with the present application are hereby incorporated by reference in their entireties under 37 CFR 1.57.

BACKGROUND OF THE INVENTION

Field of the Invention

The present invention relates to carbon fiber reinforced plastic stack machining methods using a monitoring sensor. More particularly, the present invention relates to a carbon fiber reinforced plastic stack machining method using a monitoring sensor capable of easily solving a problem that can be caused by a difference in the quality of a stack due to the quality properties of the carbon fiber reinforced plastic stacks at the time of initial entering and the machining end.

Description of the Related Art

Carbon fiber reinforced composite materials have advantages in that, compared to other types of fibers, the physical properties such as specific rigidity, specific elasticity, and heat resistance are excellent and it is possible to provide high elasticity complex. In present, carbon fiber reinforced composite materials are often used in an aviation industry because of specific properties of the material, such as specific rigidity, corrosion resistance, abrasion resistance, and high strength. Furthermore, its use in many areas such as sports goods, machinery constructions, automobiles is gradually increased.

Such a carbon fiber reinforced composite material has a problem in that properties in a thickness direction are deteriorated due to lamination manufacturing processes, and thus delamination and the like occur.

Hitherto, there is no system capable of monitoring a tool at the time of machining using a spindle of a small diameter. Thus, in present days where machine tools and machining systems are operated to achieve high accuracy, labor-saving, energy saving using an numerical control (NC) machine tool, a machining sensor, a flexible manufacturing system (F.M.S), and the like, damage of the tool becomes an extremely serious problem when the machine tool for cutting performs machining by an unmanned operation system, away from the hand of man.

Especially, in present days, spindles of the diameter of 5 mm to 12 mm are largely used in drilling for making a hole for mounting parts of an electronic product such as a computer, and for making a nozzle hole of an injection pump or the like. However, delamination occurs due to the wear of a tool. When delamination occurs, there was a problem in that products are discarded with abiding costs taken for material manufacturing and the entirety of processes. In addition, there was a problem in that tool costs become large due to the conservative approach to the wear of the tool to solve the problem described above.

In Patent Document 1 (Korean Patent Publication No. 10-1990-0017701), as a solution to such problems, a supply monitoring device for a spindle of a small diameter using a main-shaft-mounted-type torque sensor predicts the lifespan of a tool or monitors the state of machining, in such a manner that a system for automatically determining the exchange time of the tool is realized. However, machining means with respect to a boundary surface detected in heterogeneous composite materials is not proposed, and thus there was a problem in that it is difficult for the Patent Document 1 to be applied to heterogeneous composite materials.

SUMMARY OF THE INVENTION

In order to solve the problem described above, the technical issue to be achieved by the present invention is to provide a carbon fiber reinforced plastic stack machining method using a monitoring sensor which can control the process condition by grasping the quality of the workpiece and the stack structure of the workpiece in real time.

This invention, invented to achieve the technical issue described above, in terms of a carbon fiber reinforced plastic machining method of claim 1, provides a carbon fiber reinforced plastic machining method using a monitoring sensor which includes the step (a) (S10) of electrically connecting a spindle and the monitoring sensor by a computer numerical control (CNC) device, the step (b) (S20) of determining a start position in relation to machining of the spindle and a machining finish position, and the step (c) (S30) of controlling the movement speed and rotation speed of the spindle in accordance with the determination result.

Advantageous Effects of Invention

According to an embodiment of the present invention, a machining method and a machining device with respect to different-kind-bonding substance in which, when carbon fiber reinforced plastic stack materials are subjected to machining, the quality of inlet and outlet portions and a boundary surface of carbon fiber reinforced plastic stack materials can be determined through a load cell in real time, and thus the feeding speed and the rotation speed (rpm) can be controlled to be matched thereto may be provided.

In addition, the machining states of a machining tool and a workpiece can be checked through a torque sensor, a dynamometer, and an impedance sensor, and thus it is possible to change a machining process in real time and perform machining. Therefore, the machining method can be optimized to be matched with the machining condition. When the monitoring technology is adopted, it is possible to approach the process condition setup by a theoretical method, the process condition setup having been empirically conservatively approached. Therefore, the productivity can be increased and the tool costs can be reduced.

Effects of the present invention are not intended to be limited to the effects described above. It should be understood that the effects of the present invention include all effects which can be inferred from the configuration of the invention described in the detailed description or the claims of the present invention

DETAILED DESCRIPTION OF THE PREFERRED EMBODIMENTS

Figure 1:
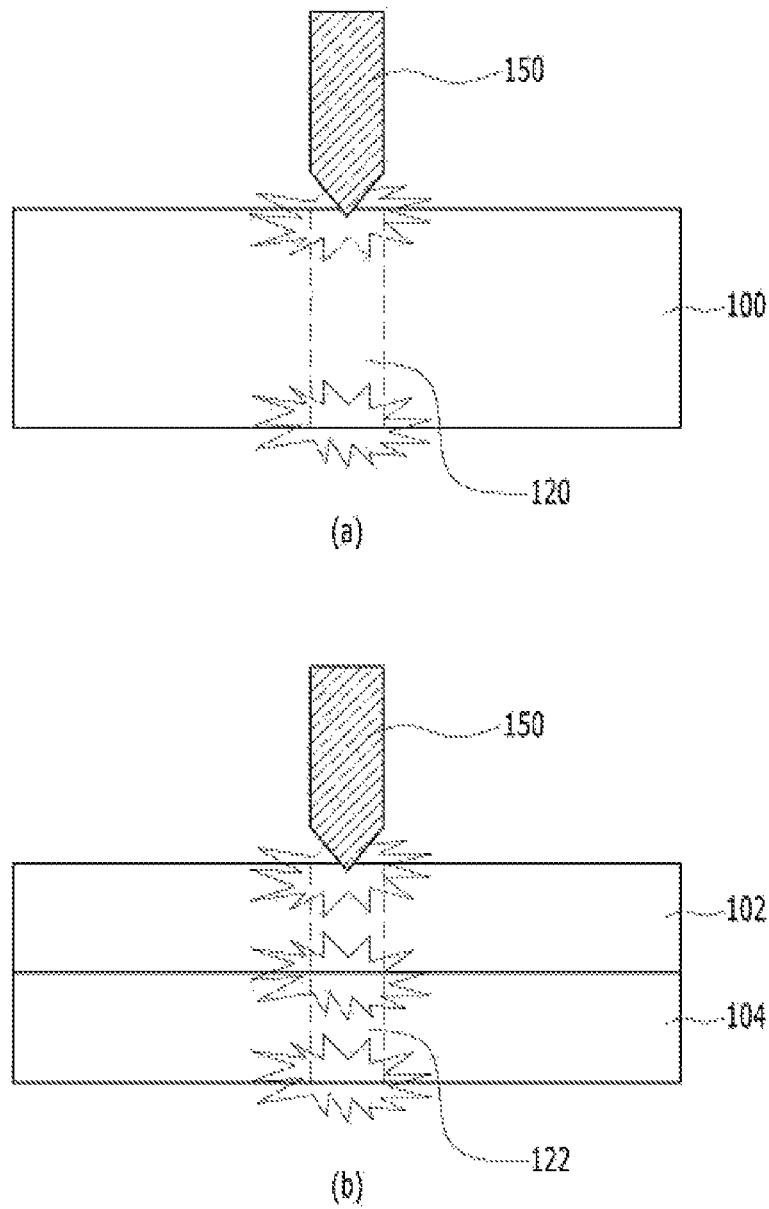
FIGS. 1A and 1B are schematic views illustrating process-control-required parts when machining materials are subjected to machining.

In order to achieve the technical issue described above, an embodiment of the present invention provides a carbon fiber reinforced plastic machining method using a monitoring sensor which includes the step (a)(S10) of electrically connecting a spindle and the monitoring sensor by a computer numerical control (CNC) device, the step (b) (S20) of determining a start position in relation to machining of the spindle and a machining finish position, and the step (c) (S30) of controlling the movement speed and the rotational speed of the spindle in accordance with the determination result.

In a carbon fiber reinforced plastic machining device of an embodiment of the present invention, it is possible to provide a carbon fiber reinforced plastic machining device which includes a monitoring sensor which measures the load on a machining material and measures the impedance between a spindle and the machining material, and a computer numerical controller which receives signals from the monitoring sensor and determines the physical properties of the machining material from the monitoring sensor.

In an embodiment of the present invention, a real-time machining method of different-kind-bonding substance using a monitoring sensor may include the step (a) (S110) of determining an inlet portion and the quality of the different-kind-bonding substance using the monitoring sensor, the step (b) (S120) of performing machining in accordance with the determination result, the step(c) (S130) of detecting a boundary surface using the monitoring sensor, the step (d) (S140) of changing the first process condition from the boundary surface condition, the step (e) (S150) of performing machining in accordance with the change of the first process condition, the step (f) (S160) of determining an outlet portion using the monitoring sensor, the step (g) (S170) of changing the second process condition in accordance with the determination result of the outlet portion, and the step (h) (S180) of performing machining in accordance with the change of the second process condition.

In a real-time machining device of different-kind-bonding substance using a monitoring sensor according to an embodiment of the present invention, it is possible to provide the real-time machining device of different-kind-bonding substance using a monitoring sensor which includes a monitoring sensor which determines a hole inlet, a hole outlet, and a boundary surface of different-kind-bonding substance, a computer numerical controller which controls the feeding speed and the rotational speed of a spindle in accordance with the determination result of the monitoring sensor, and the spindle which machines the different-kind-bonding substance by receiving signals from the monitoring sensor and the computer numerical controller.

Embodiments

Hereinafter, the present invention will be described with reference to the accompany drawings. However, the present invention may be embodied in various different forms; therefore the present invention may not be limited to the embodiments described below. In addition, in order to clearly illustrate the present invention in the drawings, the parts not related to the description are omitted and similar reference letters and numerals are given to similar parts throughout the description.

In the description, when it is described that a part is "connected" to other part, this includes not only "direct connection" but also "indirect connection" interposing the other part. In addition, when it is described that a part "includes" another component, this does not mean "another component is excluded" but "another component can be further included" as long as there is no description to be opposite.

Hereinafter, embodiments of the present invention will be described in detail with reference to the accompany drawings.

FIGS. 1A and 1B are schematic views illustrating process-control-required parts when machining materials are subjected to machining.

Referring to FIGS. 1A and 1B, it is possible to check the information on positions at which cracks or the likes can be found at the time of machining the machining materials. In other words, FIG. 1A may show a case where a machining material 100 is constituted of a single material and FIG. 1B may shows a case where the machining material 100 includes different-kind-bonding substance. The different-kind-bonding substance may include a first workpiece 102 and a second workpiece 104. For example, the first workpiece 102 and the second workpiece 104 may be first carbon fiber reinforced plastics and metals or the first carbon fiber reinforced plastics and second carbon fiber reinforced plastics.

As illustrated in FIGS. 1A and 1B, when machining is performed on the machining material 100, the loads on a spindle 150 as a machining device can be different at a machining start position and a machining finish position. Although the loads on the spindle 150 as a machining device are different from each other as described above, a case where processing defects occur at the start position or the finish position is more likely to occur when it is configured so that processes can be controlled in accordance with the predetermined thickness.

Especially, in a case of different-kind-bonding substance as illustrated in FIG. 1B, rapid change in the physical properties can occur in the bonded portion due to the difference in the quality. Particularly, in the case of an object constituted of substance of the same material, there is no serious problem. However, in a case of a bonded material of metals having good ductility and plastics having fracture properties, different-kind-bonding substance can be damaged when machining with respect to a bonded portion is not carefully performed. For example, the first workpiece 102 of FIG. 1B may be carbon fiber reinforced plastics and the second workpiece 104 may be metals.

The bonding substance of the first workpiece 102 and the second workpiece 104 of FIG. 1 may be epoxy resins.

A carbon fiber reinforced plastic stack machining device according to an embodiment of the present invention may include a load cell which measures the load on a machining material 100, an impedance sensor which measures the impedance between the spindle and the machining material 100, and a computer numerical controller 200 which receives signals from the impedance sensor and determines the physical properties of the machining material from the load cell.

The load cell described above may be used to determine an entering stage, a cutting stage, and a finishing stage of the spindle 150. The load cell described above may measure the loads on the spindle 150. A difference may occur in such loads on the spindle 150 in accordance with the quality of the machining material 100 subjected to drilling. Therefore, determination of the quality of the machining material 100 may be performed in advance before the loads on the spindle 150 is measured.

A load cell is an element having properties that electrical signals change in accordance with the pressure. The load cell checks the loads which are generated between the spindle 150 and the machining material 100 in accordance with the vertical oscillation of the spindle 150. In addition, the load cell can check the loads generated by the feeding movement and rotation movement of the spindle 150. The accuracy of machining can be improved in accordance with the loads on such a load cell. The movement of such a load cell can be controlled by the detection signals of a monitoring sensor 250.

In addition, determination of the state of machining can be performed through measuring the impedance between the machining material 100 and the spindle 150.

A computer numerical controller means a controller which commands the position of the spindle 150 in relation to the machining material 100 by numerical information corresponding thereto. The computer numerical controller means a device in which creates a command tape on which information on the shape of the machining material 100 or the condition of machining is punched and the information processing circuit reads the tape, generates command pulses, and operates a servo mechanism, in such a manner that the device can automatically perform machining in accordance with the command.

In order to effectively use such a computer numerical controller 200, it is preferable that the computer numerical controller 200 be operated and connected with the monitoring sensor 250.

One or more of a torque sensor, a load cell, a dynamometer, and an impedance sensor may be included as the monitoring sensor 250 which can be used in such computer numerical controller 200.

The spindle 150 used for machining the machining material 100 as described above may be able to determine a machining position through the load on a load cell and change the characteristics of machining. More particularly, the load cell may be used to determine the entering stage, the cutting stage, and the finishing stage of the spindle 150.

The machining material 100 used in the machining device according to the embodiment of the present invention as described above may be carbon fiber reinforced plastics (CFRP) or different-kind-bonding substance. For example, such different-kind-bonding substances can include a combination of carbon fiber reinforce plastics and metals or the first carbon fiber reinforced plastics and the second carbon fiber reinforced plastics.

Figure 2:
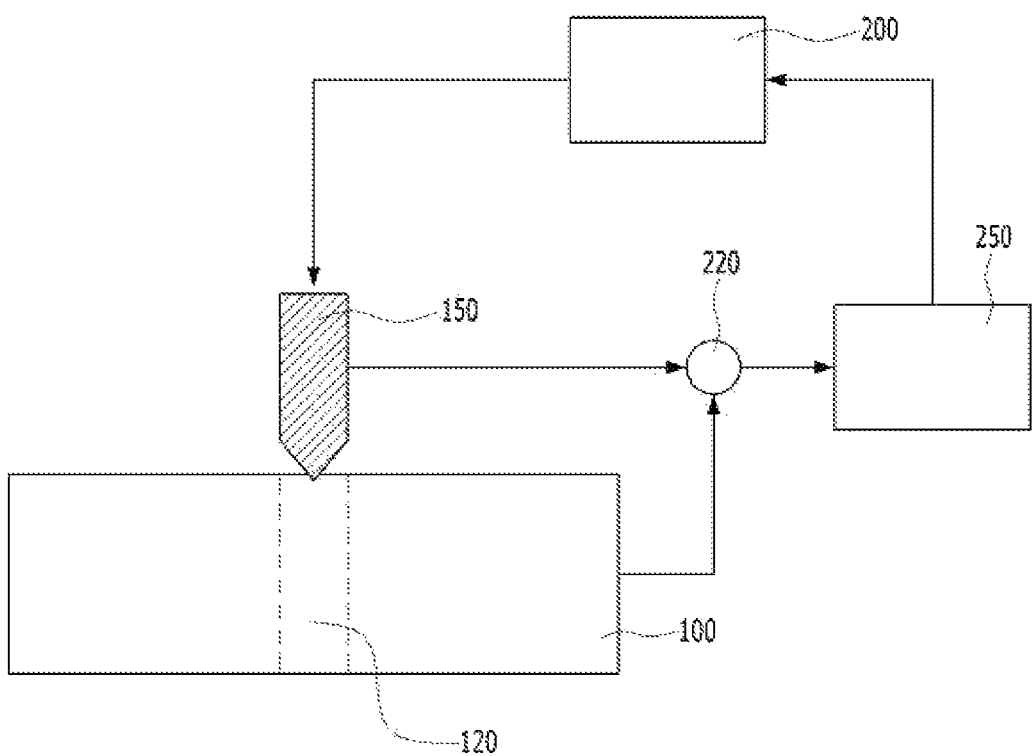
FIG. 2 is a schematic view illustrating the configuration of a machining system of carbon fiber reinforced plastics according to an embodiment of the present invention.
Figure 3:
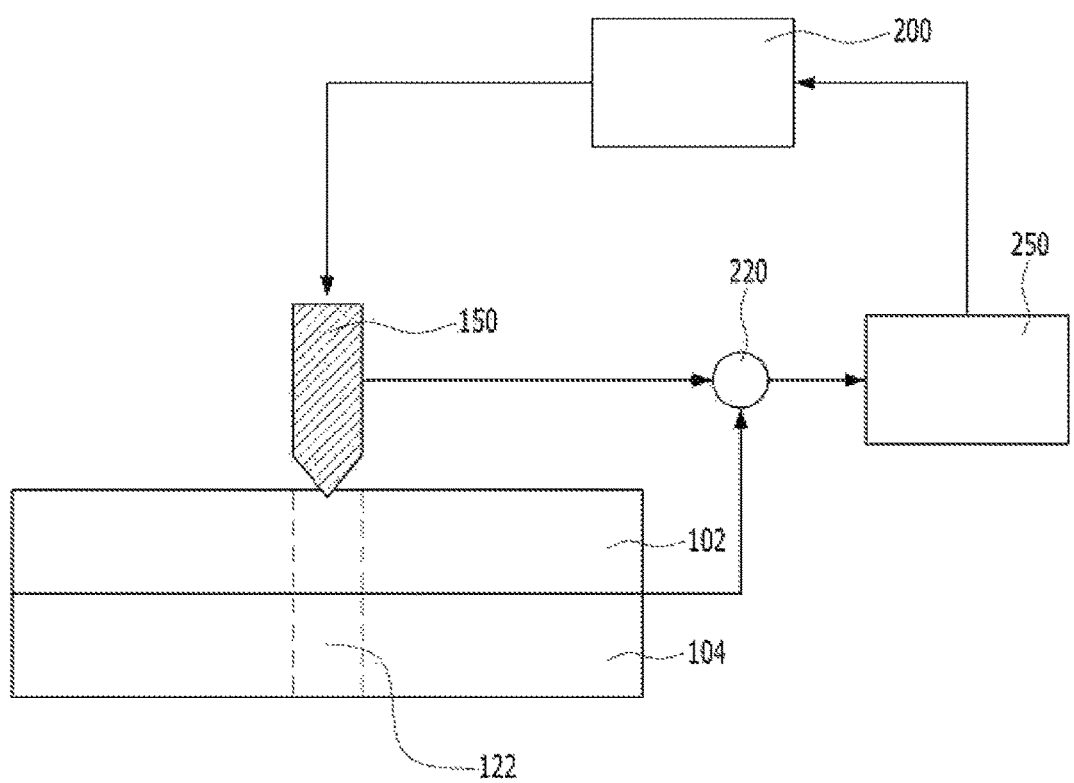
FIG. 3 is a schematic view illustrating the configuration of a machining system of carbon fiber reinforced plastics according to an embodiment of the present invention.

FIG. 2 is a schematic view illustrating the configuration of a machining system of carbon fiber reinforced plastics according to an embodiment of the present invention and FIG. 3 is a schematic view illustrating the configuration of a machining system of carbon fiber reinforced plastics according to an embodiment of the present invention.

Referring to FIGS. 2 and 3, a carbon fiber reinforced plastic machining method using a monitoring sensor will be described below.

The carbon fiber reinforced plastic machining method using a monitoring sensor according to the embodiment of the present invention may include the step (a) (S10) of electrically connecting a spindle and the monitoring sensor by a computer numerical control (CNC) device, the step (b) (S20) of determining a start position in relation to machining of the spindle and a machining finish position, and the step (c) (S30) of controlling the movement speed and the rotational speed of the spindle in accordance with the determination result.

Referring to FIG. 2, the computer numerical controller 200 may be electrically connected to the monitoring sensor 250 through a signal transmitting unit 220. The monitoring sensor 250 described above may be a device capable of determining various states of the spindle 150.

The load cell described above, a torque sensor, a dynamometer, and an impedance sensor can be included as the monitoring sensor 250.

The torque sensor and the dynamometer can measure the torque, the thrust force, the twist force on the spindle 150. When the torque stress is applied to the upper portion of a main shaft of the spindle 150 through the torque sensor, the upper portion of the body of the spindle 150 can be twisted and distorted. Such movement can be detected by a displacement sensor. When control means for such torque stress is not provided, a required machining shape cannot be obtained. An output of certain waveforms can be obtained from the displacement sensor through the operation of the torque sensor as described above. The dynamometer means an instrument for measuring the power generated from the main shaft of the spindle 150 or the power transmitted to the machining material 100 as the separated device.

The control of the displacement of the spindle 150, the displacement being measured through the load cell, can be performed by the operation of the torque sensor and the dynamometer as described above.

As illustrated in FIG. 1A, stresses are applied to the entering and the finishing parts of the spindle 150 in the machining material 100, and thus it may be difficult to perform machining properly. As a countermeasure against this, high grade machining can be performed. In this case, determination of the quality of the machining material 100 can be performed as a prerequisite.

High grade machining may be machining that the rotational speed (rpm) of the spindle 150 is increased and the feeding speed is reduced. High grade machining is precision machining and may be performed in a portion in which the spindle 150 enters the machining material 100 and a finish portion. In addition, high grade machining may be performed in a boundary portion of different-kind-bonding substance, joining resins being bonded to the different-kind-bonding substance.

In contrast, machining in which the feeding speed is increased may be performed in an inner portion of the carbon fiber reinforced plastics which is the machining material 100 of excellent cutting properties. Such determination of the feeding speed and the rotational speed can be decided from the signals sent from the monitoring sensor 250 to the computer numerical controller 200 and the information on the quality of the machining material 100.

FIG. 3 illustrates a machining system with respect to different-kind-material-bonding substance.

In FIG. 3, in the case of the different-kind-bonding substance, high grade machining can be performed in machining with respect to the boundary surface.

The different-kind-bonding substance may mean the substance of binding carbon fiber reinforced plastics and metals or the first carbon fiber reinforced plastics and the second carbon fiber reinforced plastics. Epoxy resins can be used for binding the substances described above, and thus fracture can occur at the time of high-speed machining. High grade machining can be performed which has the low feeding speed and the high rotational speed to prevent the fracture of the bonding substance described above.

In the case of the different-kind-bonding material, high grade machining is also performed in the entering portion and the finish portion, similarly to the case of FIG. 2 in which the material is constituted of single substance.

A real-time machining method of different-kind-bonding substance using a monitoring sensor may include the step (a) (S110) of determining an inlet portion and the quality of the different-kind-bonding substance using the monitoring sensor, the step (b) (S120) of performing machining in accordance with the determination result, the step (c) (S130) of detecting a boundary surface using the monitoring sensor, the step (d) (S140) of changing a first process condition from the boundary surface condition, the step (e) (S150) of performing machining in accordance with the changes of the first process condition, the step (f) (S160) of determining an outlet portion using the monitoring sensor, the step (g) (S170) of changing a second process condition in accordance with the determination result of the outlet portion, and the step (h) (S180) of performing machining in accordance with the changes of the second process condition.

The machining described above may be hole machining. The first process condition and the second process condition may be changing the rotational speed and feeding speed of the spindle 150.

The machining process described above may be performed with the real-time determination of the quality and displacement through the monitoring sensor 250 at the same time.

In the real-time machining device of different-kind-bonding substance using a monitoring sensor of the embodiment of the present invention, the monitoring sensor which determines a hole inlet, a hole outlet, and a boundary surface of different-kind-bonding substance, a computer numerical controller which controls the feeding speed and the rotational speed of a spindle in accordance with the determination result of the monitoring sensor, and the spindle which machines the different-kind-bonding substance by receiving signals from the monitoring sensor and the computer numerical controller may be included.

The load cell and monitoring sensor 250 described above may be the same components as the components described above. The details of the machining process are as described above.

The description of the present invention explained above is exemplary. Those skilled in the art to which the present invention pertain can be understood that it is possible to easily deform the embodiment in other specific forms without changing the technical spirit or essential characteristics of the present invention. Therefore, the embodiments described above should be understood that the embodiments are exemplary and do not limit the present invention in all aspect. For example, each component explained in a single shape can be realized in a divided shape, and also the components explained in a divided shape can be realized in a joined shape.

The scope of the present invention is shown by the claims described below. In addition, the meaning and scope of the claims and all changes or various forms derived from the equivalent concept thereof should be construed as being included within the scope of the present invention.

What is claimed is:

1. A method of machining carbon fiber reinforced plastic using a monitoring sensor, comprising:
   (a) electrically connecting a spindle and the monitoring sensor by a computer numerical control (CNC) device, wherein the monitoring sensor includes
   a load cell configured to check loads on the spindle generated in accordance with a vertical oscillation, a feeding movement and a rotation movement on the spindle,
   a torque sensor configured to measure torque of the spindle,
   a displacement sensor configured to detect a variation of an upper portion of the spindle and outputs certain waveforms, and
   a dynamometer configured to measure thrust force and twist force on the spindle, and
   wherein the CNC device is configured to operate a servo mechanism by commanding a position of the spindle in relation to a machining material by numerical information corresponding thereto and generating command pulses corresponding to a shape of the machining material, a condition of machining, and signals from the monitoring sensor, and control a feeding speed and a rotation speed of the spindle;
   (b) determining a machining start position in relation to machining of the spindle and a machining finish position; and
   (c) controlling the feeding speed and the rotational speed of the spindle in accordance with the machining start position in relation to machining of the spindle and the machining finish position,
   wherein the machining material includes carbon fiber reinforced plastics (CFRP) or different-kind-bonding substance, the different-kind-bonding substance being a combination of the carbon fiber reinforce plastics and different-kind materials,
   wherein when the spindle is at the machining start position or the machining finish position or at a boundary portion of the different-kind-bonding substance, the rotational speed of the spindle is increased and the feeding speed of the spindle is reduced, and
   wherein when the spindle is in an inner portion of the carbon fiber reinforced plastics of the machining material, the feeding speed of the spindle is increased.

2. The method of claim 1, wherein the machining start position in relation to machining of the spindle and the machining finish position are determined by the monitoring sensor.

3. A carbon fiber reinforced plastic machining device comprising:
   a monitoring sensor including
   a load cell configured to check loads on the spindle generated in accordance with a vertical oscillation, a feeding movement and a rotation movement on the spindle,
   a torque sensor configured to measure torque of the spindle, and
   a dynamometer configured to measure thrust force and twist force on the spindle; a displacement sensor configured to detect a variation of an upper portion of the spindle and outputs certain waveforms; and
   a computer numerical controller configured to receive signals from the monitoring sensor, operate a servo mechanism by commanding a position of the spindle in relation to a machining material by numerical information corresponding thereto and generating command pulses corresponding to a shape of the machining material or a condition of machining, and control a feeding speed and a rotation speed of the spindle,
   wherein the machining material includes carbon fiber reinforced plastics (CFRP) or different-kind-bonding substance, the different-kind-bonding substance being a combination of the carbon fiber reinforce plastics and metals or a combination of a first carbon fiber reinforce plastics and a second carbon fiber reinforce plastics, wherein when the spindle is at a machining start position in relation to machining of the spindle or a machining finish position or at a boundary portion of the different-kind-bonding substance, the rotational speed of the spindle is increased and the feeding speed of the spindle is reduced, and wherein when the spindle is in an inner portion of the carbon fiber reinforced plastics of the machining material, the feeding speed of the spindle is increased.

4. The device of claim 3, wherein the monitoring sensor determines an entering stage, a cutting stage, and a finishing stage of the spindle.

5. The method of claim 1, further comprising:
determining an inlet portion and a quality of the different-kind-bonding substance using the monitoring sensor;
performing machining in accordance with the inlet portion and the quality of the different-kind-bonding;
detecting a boundary surface using the monitoring sensor;
changing a first process condition based on the boundary surface condition;
performing machining in accordance with the changes of the first process condition;
determining an outlet portion using the monitoring sensor;
changing a second process condition in accordance with the outlet portion; and
performing machining in accordance with the changes of the second process condition.

6. The method of claim 5, wherein the machining is hole machining.

7. The device of claim 3, wherein
the monitoring sensor determines a hole inlet, a hole outlet, and a boundary surface of different-kind-bonding substance;
the computer numerical controller controls the feeding speed and the rotational speed of the spindle in accordance with the hole inlet, the hole outlet, and the boundary surface of different-kind-bonding substance; and
the spindle machines the different-kind-bonding substance by receiving signals from the monitoring sensor and the computer numerical controller.

* * * * *